United States Patent
Prasad et al.

(10) Patent No.: US 9,255,228 B2
(45) Date of Patent: Feb. 9, 2016

(54) ADVISORY CONTROLS OF DESALTER SYSTEM

(71) Applicant: General Electric Company, Schenectady, NY (US)

(72) Inventors: Vijaysai Prasad, Bangalore (IN); Jayaprakash Sandhala Radhakrishnan, Bangalore (IN); Jeffrey Allen Zurlo, The Woodlands, TX (US); Richard Stephen Hutte, Boulder, CO (US); Arjun Bhattacharyya, Bangalore (IN); Manish Joshi, Bangalore (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/242,964

(22) Filed: Apr. 2, 2014

(65) Prior Publication Data

US 2014/0214210 A1    Jul. 31, 2014

Related U.S. Application Data

(63) Continuation of application No. 13/187,819, filed on Jul. 21, 2011, now abandoned.

(51) Int. Cl.
*C10G 33/00* (2006.01)
*C10G 33/08* (2006.01)
(Continued)

(52) U.S. Cl.
CPC ............... *C10G 33/08* (2013.01); *B01D 17/04* (2013.01); *B01D 17/12* (2013.01); *C10G 31/08* (2013.01); *C10G 33/04* (2013.01); *G01F 23/2962* (2013.01); *C10G 2300/80* (2013.01)

(58) Field of Classification Search
CPC ........ B01D 17/04; B01D 17/12; C10G 31/08; C10G 2300/88; C10G 33/04; G01F 23/2962

USPC ............ 700/266, 270–273; 208/251 R, 262.1
See application file for complete search history.

(56) References Cited

U.S. PATENT DOCUMENTS

| 4,551,239 A | 11/1985 | Merchant et al. |
| 4,737,265 A | 4/1988 | Merchant, Jr. et al. |

(Continued)

FOREIGN PATENT DOCUMENTS

| CA | 2 730 628 | 1/2010 |
| CN | 200963571 | 10/2007 |

(Continued)

OTHER PUBLICATIONS

Jeelani S.A.K. et al., "Prediction of Steady State Dispersion Height from Batch Settling Data", AIChE Journal vol. 31, No. 5, pp. 711-720, May 1985.

(Continued)

*Primary Examiner* — Shogo Sasaki
(74) *Attorney, Agent, or Firm* — Meunier Carlin & Curfman LLC

(57) ABSTRACT

The present invention concerns a method of providing advisory controls for a desalter system. The method allows a user to continuously monitor performance of the desalter system, to continuously monitor position of the emulsion band (or rag layer), to control the emulsion band using demulsifiers, and to recommend to users how to maintain optimal pressure drop at the mix valve of the desalter system. This is achieved by using a first principles based model combined with an ultra-sound sensor. The ultra-sound sensor measures the position, quality and size of the emulsion band. The first principles based model takes into account the geometry of the desalter system, physical properties of the crude oil and water, as well as the operating conditions. Thus, the method provides users with sensing of an emulsion layer through ultrasound measurements and also gives recommendations on appropriate corrective actions to be initiated during upsets.

8 Claims, 3 Drawing Sheets

(51) Int. Cl.
*B01D 17/04* (2006.01)
*C10G 31/08* (2006.01)
*C10G 33/04* (2006.01)
*G01F 23/296* (2006.01)
*B01D 17/12* (2006.01)
*C01G 33/00* (2006.01)

(56) References Cited

U.S. PATENT DOCUMENTS

| | | |
|---|---|---|
| 5,493,631 A | 2/1996 | Huang et al. |
| 5,822,740 A | 10/1998 | Haissig et al. |
| 6,465,528 B1 | 10/2002 | Holtrup et al. |
| 6,532,454 B1 | 3/2003 | Werbos |
| 6,535,795 B1 | 3/2003 | Schroeder et al. |
| 6,638,983 B1 | 10/2003 | Taylor |
| 7,244,364 B1 | 7/2007 | Weber |
| 2003/0097243 A1 | 5/2003 | Mays et al. |
| 2006/0211128 A1 | 9/2006 | Johnson et al. |
| 2007/0111903 A1 | 5/2007 | Engel et al. |
| 2010/0015720 A1 | 1/2010 | McDaniel et al. |
| 2010/0089797 A1 | 4/2010 | Chakka et al. |
| 2011/0003676 A1 | 1/2011 | Collier et al. |
| 2012/0024758 A1 | 2/2012 | Love |

FOREIGN PATENT DOCUMENTS

| | | |
|---|---|---|
| CN | 201192587 | 2/2009 |
| GB | 786430 | 5/1958 |
| WO | WO 97/36178 | 10/1997 |
| WO | WO 2006/098977 | 9/2006 |
| WO | WO 2010/008911 A2 | 1/2010 |
| WO | WO 2010/008911 A3 | 1/2010 |

OTHER PUBLICATIONS

Berkman, Paul D. et al., "Dispersion of Viscous Liquids by Turbulent Flow in a Static Mixer", AIChE Journal, vol. 34, No. 4, pp. 602-609, Apr. 1988.

Al-Otaibi, MB et al., "A Computational Intelligence Based Approach for the Analysis and Optimization of a Crude Oil Desalting and Dehydration Process", American Chemical Society Publications, pp. 2526-2534, Sep. 15, 2005.

Folgueras et al., "Influence of Sewage Sludge Addition on Coal Ash Fusion Temperatures", Energy & Fuels, vol. 19, pp. 2562-2570, 2005.

Alshehri, A.K. et al., "Designing and Testing a Chemical Demulsifier Dosage Controller in a Crude Oil Desalting Plant: An Artificial Intelligence-Based Network Approach", Journal on Chemical Engineering &Technology, vol. 33, Issue 6, pp. 973-982, Apr. 28, 2010.

European Search Report and Communication mailed Nov. 27, 2012 for EP 12177263.6.

ADVISORY CONTROLS OF DESALTER SYSTEM

CROSS-REFERENCE TO RELATED APPLICATION

The present application is a continuation of Ser. No. 13/187,819 filed Jul. 21, 2011, now abandoned. The above application is herein incorporated by reference.

FIELD OF INVENTION

The present invention pertains to a method of providing advisory controls for a desalter system. More particularly, the method continuously monitors performance of the desalter system, continuously monitors position of the emulsion band, controls the emulsion band using chemicals and provides recommendations for maintaining optimal pressure drop at the mix valve.

BACKGROUND OF THE INVENTION

Desalting is typically the first operation in oil refineries. Crude oil that is processed without desalting is detrimental to the refinery assets, leading to severe corrosion problems. The desalter system removes the majority of salts in the crude oil by injecting water into the system. Because of the higher solubility in water, salts move from the crude oil to the water phase. Thus, desalter systems are typically large gravity settling tanks that provide enough residence time for both the water and the crude oil to settle. Usually density of water is higher than that of oil; hence, water settles at the bottom of the desalter system, and crude oil leaves the unit from the top. Further, the addition of an electrical grid at the top of desalter systems promotes the separation of crude oil at the top and the water to settle at the bottom.

In ideal operation, the crude oil and water should have a very thin interface. However, in practice, during the operation, an emulsion of water in crude oil is formed as a distinct layer between the water and crude oil. This emulsion band is also called a rag layer, and can be quite dynamic in position and size. Typically, these emulsion bands can cause oil refiners to run less than optimum wash water rates and low mix valve pressure drops, which reduces its efficiency for salt and sediment removal. Excessive growth of these emulsion bands can shorten the operational lifespan of the electrical grids in the desalter system, thus bringing the entire refinery operations to a halt. Accordingly, it is not only important to monitor and control the performance of the desalter system, but also to keep the position and size of the emulsion band under control.

Performance of the desalter is characterized based on three parameters: percentage salt removal in desalted crude oil relative to that of feed, percentage water removal in desalted crude oil relative to that of feed, and percentage oil carry over in brine or desalter water exit stream. Optimal operation of the desalter means very high values of salt and water removal and close to zero value for oil carryover in water.

Furthermore, operation of the desalter system is difficult and requires an expert with vast experience to make the right corrective decision. The crude oil blend in refineries changes frequently, and when the refineries process a new blend, the operators need to be able to judge performance of the desalter system without direct visibility of the emulsion band (rag layer), to determine effectiveness of the chemical treatment, and to initiate appropriate corrective actions during upset conditions.

Thus, there exists a strong need for a method of providing advisory controls for a desalter system, which continuously monitors performance of the desalter system, continuously monitors position of the emulsion band, controls the emulsion band using chemicals and provides recommendations for maintaining optimal pressure drop at the mix valve.

SUMMARY OF THE INVENTION

In one exemplary embodiment of the invention, a method of providing advisory controls for a desalter system is disclosed. The method allows a user to continuously monitor performance of the desalter system, to continuously monitor position of the emulsion band (or rag layer), to control the emulsion band using demulsifiers, and to recommend to users how to maintain optimal pressure drop at the mix valve. In another embodiment, this is achieved by using a first principles based model combined with an ultra-sound sensor. The ultra-sound sensor measures the position, quality and size of the emulsion band. The first principles based model takes into account the geometry of the desalter system, physical properties of the crude oil and water, as well as the operating conditions.

Once the ultra-sound sensor measures the emulsion band, a Model Predictive Controls is utilized to dose the chemicals so that the sensed emulsion band is under control. Advisory solutions are then provided to users on the effect of changing the mix valve pressure drop based on the performance of the desalter system. Recommendations are also provided to the users based on the effect variation in wash water flow rate and based on performance of the desalter system. Thus, the method provides users with sensing of an emulsion layer through ultrasound measurements and also gives recommendations on appropriate corrective actions to be initiated during upsets.

The present invention and its advantages over the prior art will become apparent upon reading the following detailed description and the appended claims with reference to the accompanying drawings.

BRIEF DESCRIPTION OF THE DRAWINGS

These and other aspects of the invention will be understood from the description and claims herein, taken together with the drawings showing details of construction and illustrative embodiments, wherein:

DETAILED DESCRIPTION

Figure 1:
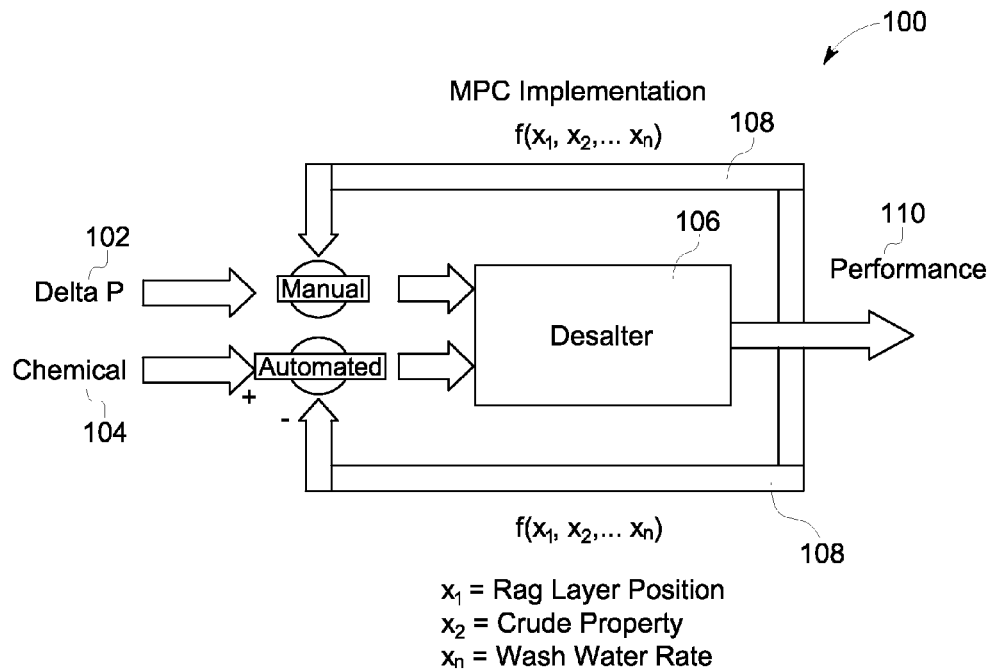
FIG. 1 is a schematic process diagram showing one embodiment of the invention.

Approximating language, as used herein throughout the specification and claims, may be applied to modify any quantitative representation that could permissibly vary without resulting in a change in the basic function to which it is related. Accordingly, a value modified by a term or terms, such as "about", is not limited to the precise value specified. In at least some instances, the approximating language may correspond to the precision of an instrument for measuring the value. Range limitations may be combined and/or interchanged, and such ranges are identified and include all the sub-ranges stated herein unless context or language indicates otherwise. Other than in the operating examples or where otherwise indicated, all numbers or expressions referring to quantities of ingredients, reaction conditions and the like, used in the specification and the claims, are to be understood as modified in all instances by the term "about".

"Optional" or "optionally" means that the subsequently described event or circumstance may or may not occur, or that the subsequently identified material may or may not be present, and that the description includes instances where the event or circumstance occurs or where the material is present, and instances where the event or circumstance does not occur or the material is not present.

As used herein, the terms "comprises", "comprising", "includes", "including", "has", "having", or any other variation thereof, are intended to cover a non-exclusive inclusion. For example, a process, method, article or apparatus that comprises a list of elements is not necessarily limited to only those elements, but may include other elements not expressly listed or inherent to such process, method, article, or apparatus.

The singular forms "a", "an", and "the" include plural referents unless the context clearly dictates otherwise.

Disclosed is an improved method of providing advisory controls for a desalter system. The method allows a user to continuously monitor performance of the desalter system, to continuously monitor position of the emulsion band (or rag layer), to control the emulsion band using demulsifiers, and to recommend to users how to maintain optimal mix valve delta pressure (delta P) drop at the mix valve. In one embodiment, this is achieved by using a first principles based model combined with an ultra-sound sensor. The ultra-sound sensor measures the position, quality and size of the emulsion band. The first principles based model takes into account the geometry of the desalter system, and physical properties of the crude oil and water, as well as the operating conditions.

The method of providing advisory controls for a desalter system utilizes the process model and the actual constraints that arise while controlling the desalter system. Typically, there are three manipulated variables that control the desalter system. The variables include the chemical dosing pump that controls the release of chemicals, such as demulsifiers to control the emulsion band. The mix valve delta pressure drop that controls the quality of the emulsion formed depending on the percentage opening of the valve. And, the wash water rate that controls the performance of the desalter system. (See FIG. 1).

The proposed method can also utilize online measurements of performance parameters; if available, these include percentage salt and water removal in desalted crude and oil carry over in desalter brine; these measurements can be used to estimate or fine tune model parameters of the controller. (See FIG. 1).

In one embodiment, based on above variables, the method of providing advisory controls for a desalter system utilizes a Model Predictive Control to automatically dose the chemicals such that the sensed emulsion band is under control. Advisory solutions are then provided to users on the effect of changing the mix valve delta pressure drop based on the performance of the desalter system. Recommendations are also provided to the users based on the effect of variation in wash water flow rate which is based on performance of the desalter system.

In operation, the desalter system is difficult to operate and requires an expert with vast experience to make the right corrective decision. For example, the crude blend in oil refineries changes frequently. Thus, when refineries process a new blend, operators must recalculate and adjust chemical dosage, mix valve pressure drop and wash water rates of the desalter system. However, monitoring performance can be difficult as users do not have direct visibility of the desalter system, they also do not know the effectiveness of the chemical treatment or the appropriate corrective actions to be initiated during upset conditions. The proposed method addresses these concerns and allows users to have sensing of the emulsion layer through ultra-sound measurements and also gives recommendations on appropriate corrective actions to be initiated during upsets.

Ultra-sound measurements are used to monitor position of the emulsion band. An ultra-sound transmitter and receiver are inserted at various levels of the desalter system, and the time of flight is measured. The time of flight is the time it takes for the ultra-sound to travel through the water from the transmitter to the receiver. (See US 2006/0211128 A1, Johnson et al.).

Upset conditions cause the emulsion band to grow, so operators need to monitor position of the emulsion band. Operators want the emulsion band to be as small and as thin as possible. Monitoring of the emulsion band can thus be done via sensing of the emulsion band through ultra-sound measurements.

Furthermore, chemical treatment, or the addition of demulsifiers is a difficult task if done without obtaining feedback on the performance of the desalter system. Excessive addition of the demulsifiers tends to stabilize the emulsion, but causes severe performance issues with the desalter system. Subsequently, underdoses are always ineffective in breaking the emulsions. Thus, it is important to add the demulsifiers until the point of inflection is reached. The point of inflection is determined when maximum entitlement has been reached. Specifically, the addition of chemicals improves performance to a certain point. Once this point is reached, then performance will decrease with the addition of chemicals. This maximum entitlement point is the point of inflection.

Typical demulsifiers used in the chemical treatment of the emulsion band include, but are not limited to, water soluble organic salts, sulfonated glycerides, sulfonated oils, acetylated caster oils, ethoxylated phenol formaldehyde resins, polyols, polyalkylene oxides, ethoxylated amines, a variety of polyester materials, and many other commercially available compounds. Specifically, the demulsifiers can comprise oxyalkylated amines, alkylaryl sulfonic acid and salts thereof, oxyalkylated phenolic resins, polymeric amines, glycol resin esters, polyoxyalkylated glycol esters, fatty acid esters, oxyalkylated polyols, low molecular weight oxyalkylated resins, bisphenol glycol ethers and esters and polyoxyalkylene glycols. This enumeration is, of course, not exhaustive and other demulsifying agents or mixtures thereof can be used as is known to one skilled in the art.

Furthermore, the operator advisory system recommends to operators how to maintain optimal mix valve delta P drop at the mix valve. Based on feedback options such as emulsion layer position, crude oil properties and wash water rate, the effect of delta P on performance is determined and recommendations are provided to the operator. Further, depending on the maximum entitlement, operators can make decisions to impact percentage opening of the mix valve as well.

As shown in FIG. 1, Model Predictive Controls (MPC) implementation of the desalter system 100 comprises a dynamic desalter model, the model is built using the physics of the desalter and establishes an explicit transfer function between the chemical addition and performance, and delta P and performance. Specifically, the MPC allows for manual control of the delta P 102 and automated control of chemical dosing 104 directly in the desalter device 106. The delta P 102 and chemical dosing 104 are continuously monitored, providing feedback 108 to the control room (not shown) for the operators. The feedback options include emulsion layer position, crude oil properties and wash water rate, and the MPC implementation utilizes the feedback options to develop a dynamic desalter model 100. Specifically, the MPC implementation 100 establishes explicit transfer functions between the chemical addition 104 and performance 110, and the delta P 102 and performance 110, wherein $f(x_1, x_2, \ldots x_n)$, with $x_1$=emulsion layer position, $x_2$=crude oil properties, $x_n$=wash water rate and optionally, $x_3$=Salt removal from crude, $x_4$=Water removal from crude, $x_5$=oil carryover in brine.

Figure 2:
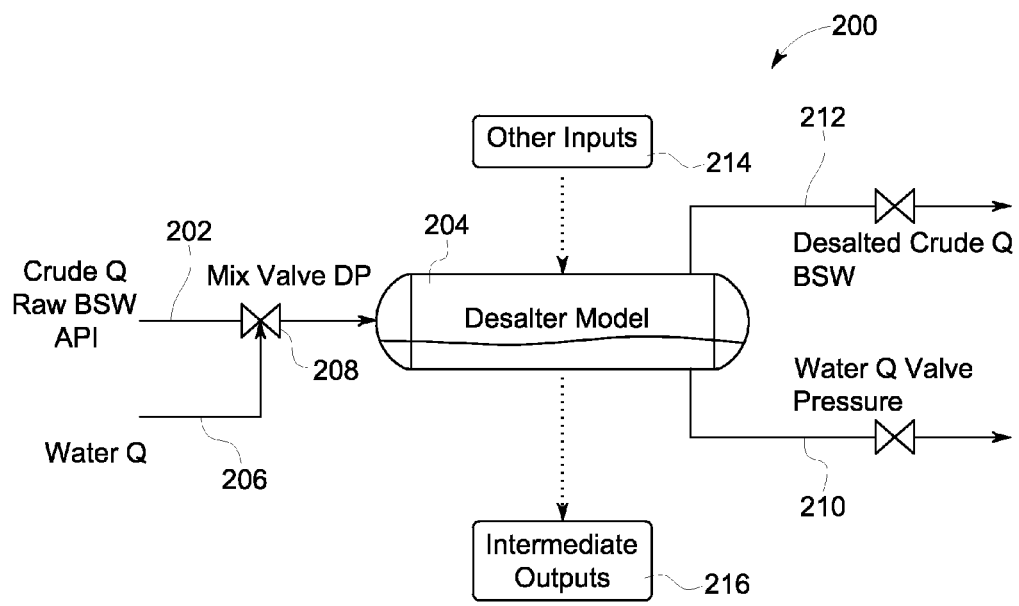
FIG. 2 is a schematic process diagram showing the desalter model framework of the present invention.

As shown in FIG. 2, a desalter model framework 200 comprises an input of crude oil 202, which is continuously flowing into the desalter model 204. Water 206 is then injected into the desalter model 204, and is controlled by the mix valve delta P 208. The water 206 mixes with the crude oil 202 in the desalter model 204, and because of the higher solubility in water, salts move from the crude oil to the water phase. The desalter model 204 then provides enough residence time for both the water and the crude oil to settle. Due to the density differences, water settles at the bottom of the desalter model 204 and exits via a valve on the bottom 210, and desalted crude oil leaves the desalter model 204 from the top 212.

Further, other inputs 214, such as dimensions of the desalter model, atmospheric pressure, physical properties of the desalter model, the efficiency limit of the electric field and chemical dosage, are used to develop the dynamic desalter model. From these additional inputs 214, the desalter model 204 creates intermediate outputs 216, such as drop size distribution, and emulsion layer height and thickness. The drop size distribution is dependent on the delta P 208, wherein if the mix valve delta P 208 creates low pressure, drop size is smaller and salt removal efficiency is high, but settling of the water is slower. Whereas, if the mix valve delta P 208 creates high pressure, drop size is larger and settling of the water is faster, but salt removal efficiency is low. These additional outputs 216 are used to develop a dynamic desalter model for use with the Model Predictive Controls. For example, the Model Predictive Controls disclose the following formula used to determine automatic online control of chemical dosing and advisory control of delta P:

$$\begin{bmatrix} \eta_1 \\ \eta_2 \\ \vdots \\ \eta_n \end{bmatrix} = \begin{bmatrix} f_{11}(x_1 \ldots x_n) & f_{12}(x_1 \ldots x_n) \\ f_{21}(x_1 \ldots x_n) & f_{22}(x_1 \ldots x_n) \\ \vdots & \vdots \\ f_{n1}(x_1 \ldots x_n) & f_{n2}(x_1 \ldots x_n) \end{bmatrix} \begin{bmatrix} \text{Chemical } Conc. \\ \Delta P_{mix\ value} \end{bmatrix}$$

$\eta_i \rightarrow$Performance Parameters (emulsion layer, salt concentration, etc.)

$x_i \rightarrow$Measurements (temperature, density, viscosity, etc.)

The proposed structure essentially helps to automate performance through chemical dosing and gives recommendations to the operator on effect of delta P on performance.

Figure 3:
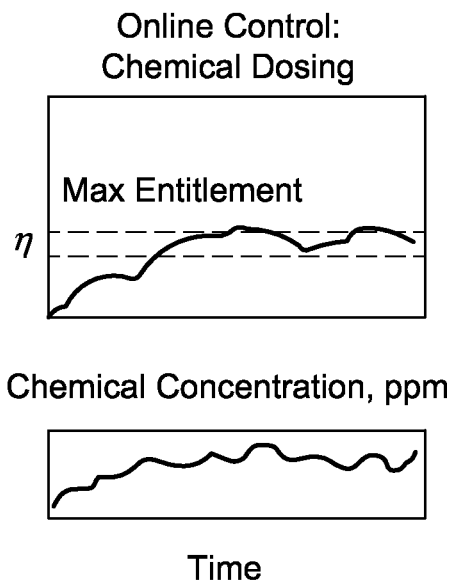
FIG. 3 is a graph depicting the dynamic effect of chemical dosage of the present invention.

FIG. 3 depicts a graph showing online control of chemical dosing. The dashed lines represent the maximum efficiency of the chemical concentration. The MPC is able to establish explicit transfer functions between chemical addition and performance.

Figure 4:
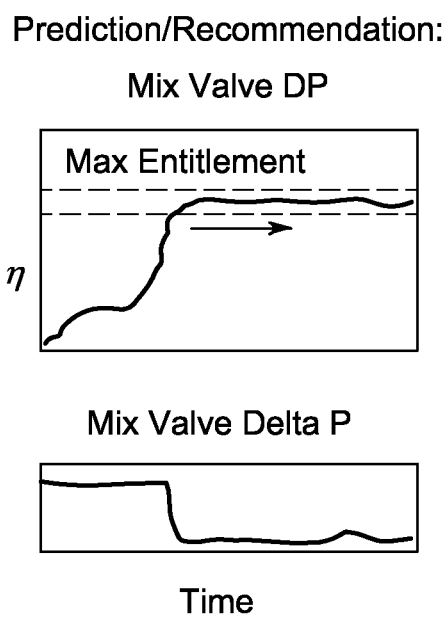
FIG. 4 is a graph depicting the dynamic effect of mix valve delta P (pressure) of the present invention.

FIG. 4 depicts a graph showing predictions/recommendations for manually controlling the mix valve delta P. The dashed lines represent the maximum efficiency of mix valve delta P. The MPC is able to establish explicit transfer functions between delta P and performance.

Figure 5:
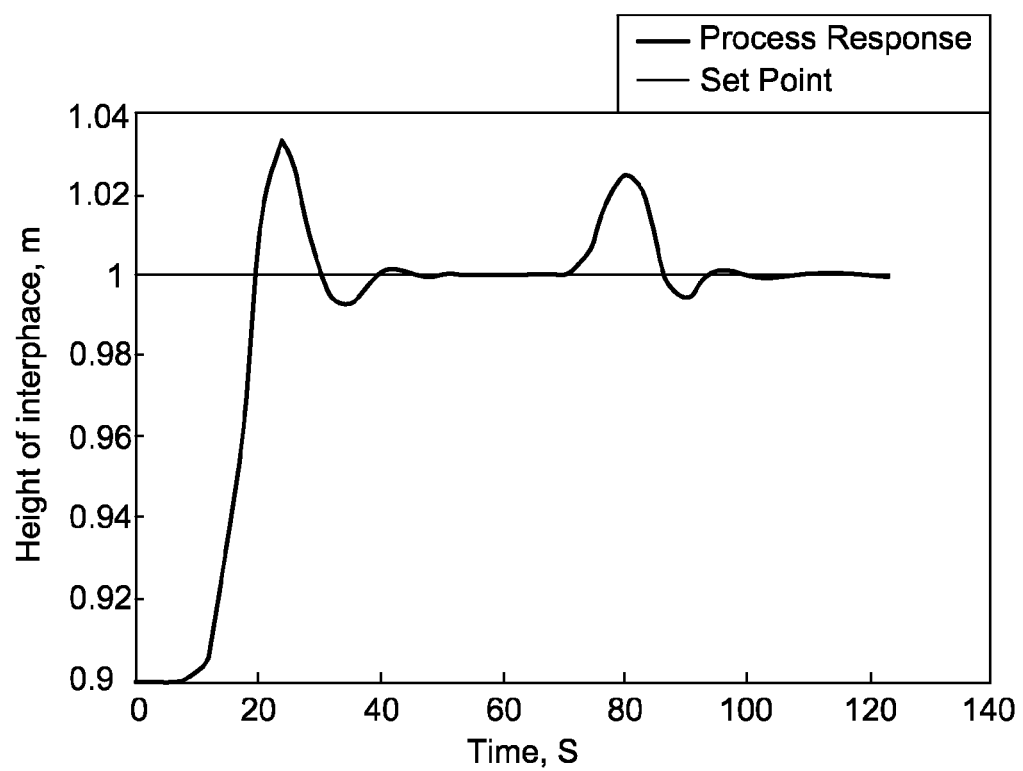
FIG. 5 is a graph depicting a step change in wash water rate of the present invention.

FIG. 5 depicts a graph showing a step change in the wash water rate. Typically, the wash water rate is at 5%; however, at around 60 seconds, a step change occurred and the wash water was adjusted accordingly.

In operation, the desalter model is created using the physics of the desalter system. The desalter model is used in the Model Predictive Controls to automate performance through chemical dosing and to give recommendations to the operator on effect of delta P on performance. To determine the desalter model, an overall material balance is calculated:

The rate of change of rag layer thickness (dh/dt) can be calculated using mass balance for the desalter system. Rate of change of rag layer mass=Mass of Fluids In—Mass of Fluids Out. In addition, Bernoulli's principle equation is used to relate the pressure head and the velocity heads of the fluids inside the desalter.

Further, the emulsion band thickness can be calculated for a specific crude oil—water mixture from batch settling experiments using correlation available in the literature. (See S. A. K. Jeelani and Stanley Hartland, *Prediction of Steady State Dispersion Height from Batch Settling Data, AIChE Journal*, 31(5), 711, (1985)).

Then, water and crude oil volumes are calculated in the desalter, using the desalter's actual shape (including the dished end portions) and the position of the rag layer. The volumes are expressed as a function of the height of the rag layer.

The size distribution of the water droplets at the desalter entrance is a function of various parameters including the crude oil and water flow rates, fluid properties (viscosity, density, and surface tension), temperature, pressure drop at the mix valve, dimensions of the mix valve. The Sauter mean diameter of the water droplets is calculated using these parameters.

The overall drop size distribution of water droplets is determined from the Sauter mean diameter using multiple correlations. (See Paul D. Berkman and Richard V. Calabrese, *Dispersion of Viscous Liquids by Turbulent Flow in a Static Mixer, AIChE Journal*, 34(4), 602, (1988)).

The terminal settling velocity of the water droplets in the oil phase is calculated using Stokes law. It takes into account the diameter of the particles, viscosity of the continuous phase and the difference in densities between the two phases. The volume fraction of the dispersed phase (water) is used to calculate the hindered settling velocity of the water drops.

In a desalter, both the demulsifier chemicals and the electrical field generated by the grid perform one function—to reduce the repulsive forces between the water droplets, agglomerate them, leading to coalescence and increase in size of the drops. The quantitative effect of the chemical dosage and electrical field on the droplet size is added in the form of empirical correlations. These effects are incorporated in the form of a 'size increase factor'.

The individual residence times of the water phase and the oil phases in the desalter are calculated using the respective flow rates and the volumes occupied by each phase in the desalter. Based on the residence time of the phases and the settling velocity of the drops, a 'Critical Drop Diameter' is calculated. This is the smallest drop size that can settle into the water phase within the available residence time. Drops smaller than this critical size, do not settle and are carried over in the oil stream. Based on the fraction, the water-separation efficiency of the desalter is calculated.

Finally, the electrical grid, and the effect of the mix valve delta P performance and chemical selection and dosage is determined. Based on these model steps, model results are calculated to determine predicted drop size distribution, predicted emulsion band thickness, predictive demulsifier dosage, etc. These predictions can then be used to create the desalter model. The desalter model is then used in the Model Predictive Controls to automate performance through automatic, online chemical dosing and to give recommendations to the operator on the effect of delta P on performance.

While this invention has been described in conjunction with the specific embodiments described above, it is evident that many alternatives, combinations, modifications and variations are apparent to those skilled in the art. Accordingly, the preferred embodiments of this invention, as set forth above are intended to be illustrative only, and not in a limiting sense. Various changes can be made without departing from the spirit and scope of this invention. Therefore, the technical scope of the present invention encompasses not only those embodiments described above, but also all that fall within the scope of the appended claims.

This written description uses examples to disclose the invention, including the best mode, and also to enable any person skilled in the art to practice the invention, including making and using any devices or systems and performing any incorporated processes. The patentable scope of the invention is defined by the claims, and may include other examples that occur to those skilled in the art. These other examples are intended to be within the scope of the claims if they have structural elements that do not differ from the literal language of the claims, or if they include equivalent structural elements with insubstantial differences from the literal language of the claims.

What is claimed is:

1. A method of controlling a desalter using Model Predictive Control (MPC) and a controller comprising:
   a) feeding crude oil and water to a desalter through a mixing device to form an emulsion, wherein a change in pressure (delta P) occurs across the mixing device;
   b) feeding the emulsion to a desalter, wherein the emulsion forms an oil phase, a water phase, and an emulsion band layer providing an interface between said oil phase and said water phase in the desalter;
   c) creating a dynamic desalter model for use with the MPC;
   d) receiving, by the controller, a plurality of inputs, wherein
       the plurality of inputs comprise an emulsion layer position,
       crude oil properties, salt removal from the crude oil, water removal from the crude oil, and crude oil carryover in the removed water;
   e) using the plurality of inputs in the dynamic desalter model to generate at least one output for control of the desalter, said at least one output comprising a recommended dosage of at least one demulsifying chemical, a mixing device delta P recommendation, or a wash water flow rate recommendation and following one of the recommendations and adjusting the dosage of the at least one demulsifying chemical, the mixing device delta P, or the wash water flow rate.

2. A method as recited in claim 1 wherein said at least one demulsifying chemical is selected from the group consisting of oxyalkylated amines, alkylaryl sulfonic acid and salts thereof, oxyalkylated phenolic resins, polymeric amines, glycol resin esters, polyoxyalkylated glycol esters, fatty acid esters, oxyalkylated polyols, low molecular weight oxyalkylated resins, bisphenol glycol ethers and esters, and polyoxyalkylene glycols.

3. The method of claim 1, wherein said emulsion layer position is measured using an ultra sound sensor.

4. The method of claim 1 further comprising generating at least one additional output to change an actual dosage of at least one demulsifying chemical to said recommended dosage.

5. The method of claim 1 further comprising:
   (a) receiving at least one additional input wherein said at least one additional input is an actual dosage of at least one demulsifying chemical; and
   (b) using said plurality of inputs and said at least one additional input in a dynamic desalter model to generate at least one output, said at least one output comprising a recommended dosage of at least one demulsifying chemical.

6. The method of claim 1 further comprising:
   (a) measuring at least one performance characteristic selected from a percentage of salt removed from the crude oil, a percentage of water removed from the crude oil, and a percentage oil carry over in a brine, wherein:
       (i) the percentage of salt removed from the crude oil is determined by comparing an amount of salt present in desalted crude oil leaving said desalter relative to an amount of salt present in said feed crude oil;
       (ii) the percentage of water removed from the crude oil is determined by comparing an amount of water present in the desalted crude oil leaving said desalter relative to an amount of water present in said feed crude oil; and
       (iii) the percentage oil carry over in the brine is a crude oil content in the removed water stream exiting the desalter; and
   (b) receiving said at least one performance characteristic and using it in said dynamic desalter model to generate said at least one output.

7. The method of claim 1 comprising at least two additional inputs selected from the group consisting of an actual dosage of at least one demulsifying chemical, an actual mix valve change in pressure (deltaP), and an actual wash water flow rate.

8. The method of claim 6 further comprising:
   (a) using said dynamic desalter model to generate at least one additional output, said at least one additional output comprising determining a maximum entitlement of said at least one demulsifying chemical wherein said maximum entitlement is a demulsifying chemical dosage at which said at least one performance characteristic does not improve by increasing said demulsifying chemical dosage; and
   (b) using said maximum entitlement to determine said recommended dosage.

* * * * *